United States Patent [19]
Rohrer

[11] 3,955,949
[45] May 11, 1976

[54] FLAME RETARDING FILTER DEVICE
[75] Inventor: John F. Rohrer, Moline, Ill.
[73] Assignee: Smith Filter Corporation, Moline, Ill.
[22] Filed: Oct. 15, 1974
[21] Appl. No.: 514,378

[52] U.S. Cl. .................................. 55/444; 55/446; 98/115 K; 55/DIG. 36
[51] Int. Cl.² ......................................... B01D 45/08
[58] Field of Search ............ 55/440, 442, 443, 444, 55/445, 446, 462, DIG. 36, DIG. 37; 98/115 K

[56] References Cited
UNITED STATES PATENTS

| 1,673,906 | 6/1928 | Fager .............................. 55/443 X |
| 1,926,262 | 9/1933 | Campbell ........................ 55/444 X |
| 2,292,665 | 8/1942 | Schneible ....................... 55/442 X |
| 2,422,527 | 6/1947 | Campbell ........................ 55/444 |
| 2,523,529 | 9/1950 | Zwickl ............................ 55/442 X |
| 2,720,938 | 10/1955 | Cates .............................. 55/444 |
| 2,752,005 | 6/1956 | Auera et al. ................... 55/440 X |
| 3,141,910 | 7/1964 | Pearce ............................ 55/444 X |
| 3,566,585 | 3/1971 | Voloshen et al. .............. 55/443 X |

FOREIGN PATENTS OR APPLICATIONS
282,280   2/1931   Italy ..................................... 55/446

Primary Examiner—Frank W. Lutter
Assistant Examiner—David L. Lacey
Attorney, Agent, or Firm—Fitch, Even, Tabin & Luedeka

[57] ABSTRACT

A flame retarding filter device is disclosed for use in an air exhaust system wherein the exhaust air carries grease particles and the like susceptible to combustion. The device has first and second rows of spaced parallel baffle elements each of which has a generally planar central portion and inclined longitudinal edges. The rows of baffle elements are supported in spaced relation with the baffle elements of the rearward row overlying the spaces between the baffle elements of the front row in a manner to retard the passage of flames through the device while allowing sufficient free flow of air through the unit to exhaust heat and odors from the room in which the device is employed.

8 Claims, 5 Drawing Figures

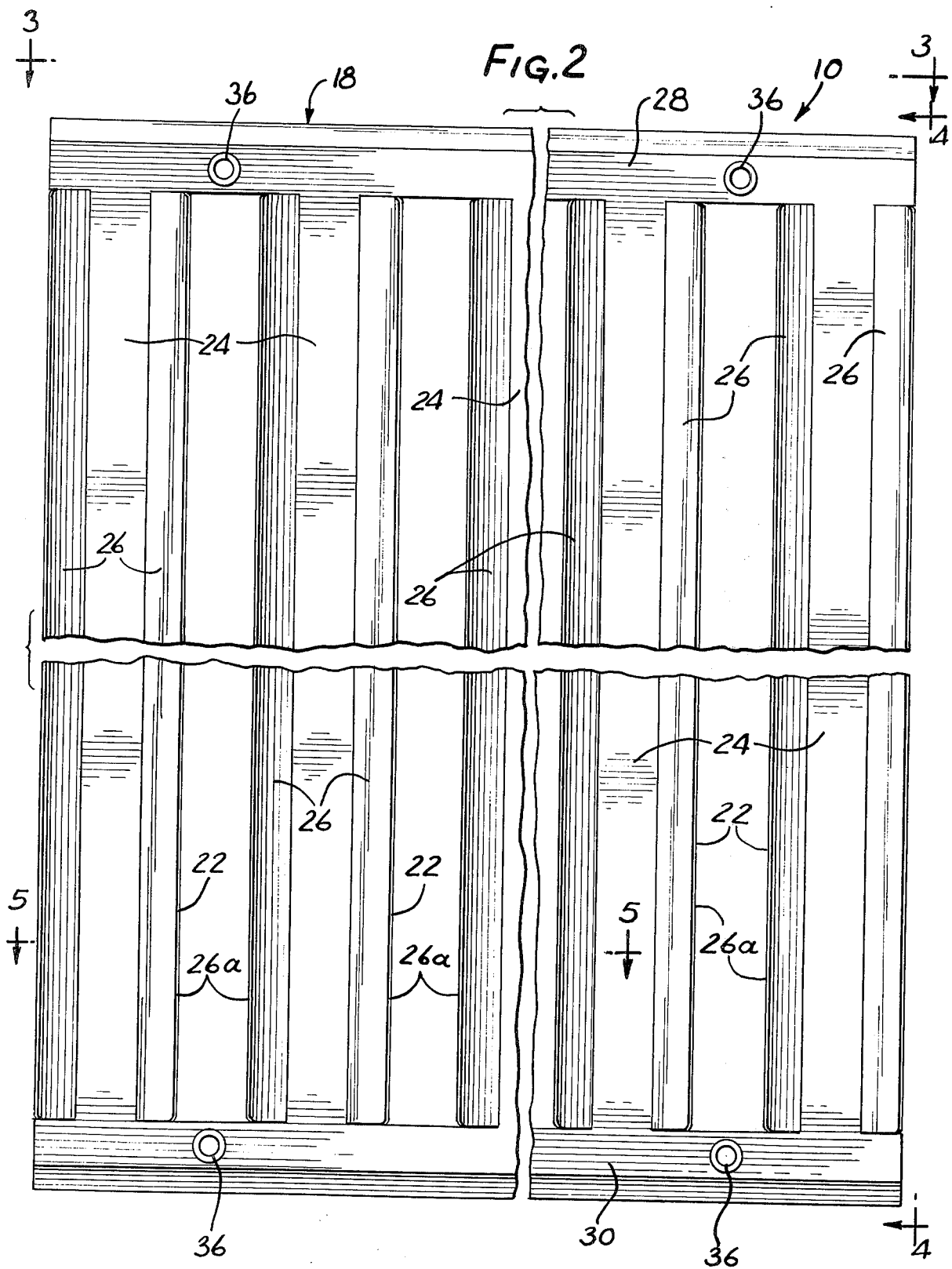

FLAME RETARDING FILTER DEVICE

The present invention relates generally to flame retarding filter devices, and more particularly to a novel flame retarding filter device for use in an air exhaust system to retard flame penetration through the device while allowing sufficient air flow to exhaust heat and odors through the device.

It is a conventional practice in commercial and institutional kitchens and the like to employ exhaust systems which may include a canopy overlying the grills and/or broilers, with exhaust fans generally being provided to effect the flow of grease laden air through associated exhaust ducts to exhaust the gases externally of the kitchen area. It is a common practice to employ grease filters within such exhaust systems, for example by mounting one or more grease filters in the canopy, which serve to extract grease and oil particles and the like entrained in the exhaust air.

Accepted standards of safety for commercial type kitchen exhaust systems require that the filters employed in such systems to remove grease particles from the exhaust air also be capable of retarding flame to prevent its passage through the filters with possible combustion of grease residue in the exhaust ducts downstream of the filters. Typically, "mesh" type grease filters are employed in commercial and industrial exhaust systems because of their relatively high efficiency, i.e. in the order of 90–93%, in removing grease particles from the exhaust air. Such "mesh" type grease filters, however, generally lack the necessary flame retarding capabilities required to pass accepted safety standards. To meet the flame retarding requirements, "flame" type filters are frequently used in exhaust systems to retard flame penetration through the filters. The "flame" filters, per se, however, have relatively low grease removal efficiency, i.e., in the order of 30-40%. Because of their low grease removal efficiency, it is desirable that flame type filters be used in conjunction with mesh type grease filters so that high efficiency flame retarding and grease filtering are obtained. The known flame filters cannot be used with the higher efficiency mesh type grease filters in conventional exhaust canopy systems because the flame filter profile dimensions are too great to allow back-to-face mounting in standard size filter support frames built into the canopy structures.

The present invention is directed to an improved flame retarding filter device for use in conjunction with a higher efficiency grease filter in a kitchen exhaust system or the like to prevent flame from passing through the device into the associated grease filter and exhaust ducts.

Accordingly, one of the primary objects of the present invention is to provide an improved flame retarding filter device which retards the passage of flames through the filter device while simultaneously allowing a sufficient free flow of air to exhaust heat and odors from a kitchen area.

Another object of the present invention is to provide a flame retarding filter having a relatively thin profile which adapts the filter for mounting in back-to-face relation with a grease filter in a conventional grease filter support frame, such as in a canopy type exhaust system.

Still another object of the present invention is to provide a flame retarding filter device which employs a plurality of selectively positioned baffles or fins which serve to reverse the direction of any flame impinging on the device while allowing the passage of exhaust air through the device.

Another object of the present invention is to provide a flame retarding filter device as described wherein forward and rear rows of selectively positioned baffles provide a solid direction changing barrier to flame impingement, but which allow sufficient air movement to exhaust heat and odors through the filter device.

Yet another object of the present invention is to provide a flame retarding device as described which allows substantially complete drainage of grease particles and the like which condense on the baffles, whereby to make the device relatively self-cleaning.

Further objects and advantages of the present invention, together with the organization and manner of operation thereof, will become apparent from the following detailed description of the invention when taken in conjunction with the accompanying drawings wherein like reference numerals designate like elements through the several views, and wherein:

FIG. 2 is an enlarged but foreshortened front elevational view of a flame retarding filter device constructed in accordance with the present invention;

Figure 1:
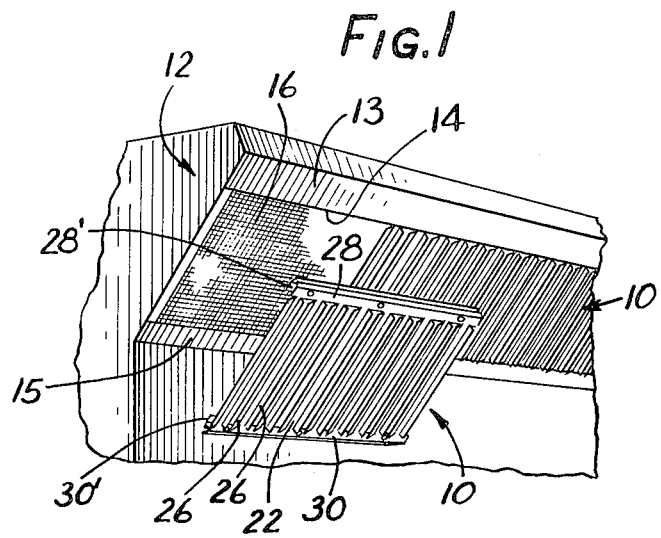
FIG. 1 is a partial perspective view of an exhaust hood having flame retarding filters in accordance with the present invention supported therein.

Referring now to the drawings, and in particular to FIG. 1, a plurality of flame retarding filter devices constructed in accordance with the present invention, each of which is indicated generally at 10, are illustrated in conjunction with an exhaust canopy, indicated generally at 12, of generally conventional construction. One of the flame retarding filters 10 is shown spaced outwardly from an air intake flow passage 14 formed in the exhaust canopy 12. The exhaust canopy 12 is of the type conventionally employed in commercial kitchens and the like, with the air intake passage 14 being disposed to generally overlie a grill or broiler or the like such that an exhaust fan (not shown) disposed rearwardly from the air intake passage 14 will effect air flow through the air intake passage and outwardly from the kitchen area through associated exhaust ducts.

The air flow caused to pass through the exhaust canopy 12 and outwardly through the associated exhaust ducts is frequently heavily ladened with grease particles and the like which are susceptible to combustion. As noted above, flame retarding filters of the general type to which the present invention is directed do not remove grease particles and the like from the exhaust air as well as conventional mesh type grease filters. It is therefore desirable that the flame retarding filters be employed in conjunction with mesh type grease filters so that high efficiency in both flame retarding and grease filtering is obtained.

The conventional exhaust canopy constructions, such as partially illustrated in FIG. 1, have generally U-shaped channels 13 and 15 which define the upper and lower horizontal edges, respectively, of the air intake passages 14. The U-shaped channels 13 and 15 of standard size commercial exhaust canopies have transverse openings of approximately 1⅞ inches, nominally termed 2 inch channels, between the walls of the channels. The support channels can thus receive and support the known mesh type grease filters which are approximately 2 inches thick, considered in edge profile. With mesh type grease filters of known design mounted within the support channels 13 and 15, there is no room left for mounting a flame retarding filter in back-to-face relation with the known mesh type grease filters.

One of the principal features of the flame retarding filter of the present invention is its relatively thin profile thickness, being in the order of ⅝ inch, which lends itself to mounting forwardly of and in back-to-face relation with a suitable higher efficiency mesh type grease filter such as commercially available from Smith Filter Corporation, Moline, Ill., as its Series 6400 grease filter. The referenced Series 6400 grease filter has a transverse profile thickness of approximately 1 1/4 inches so that a Series 6400 type grease filter, one of which is shown at 16 in FIG. 1, and a flame retarding filter 10 may be mounted in back-to-face relation within the standard size U-shaped channels 13 and 15 at the entrance of the air intake passage 14 to both retard flame penetration and filter out the major portion of any airentrained grease particles and the like in the exhaust air.

The flame retarding filter devices 10 in accordance with the present invention prevent any flame from passing into the exhaust canopy and associated air ducts where the flame might cause combustion of grease or other combustible particle residue on the interior surfaces of the canopy and exhaust ducts. A plurality of flame retarding filter devices 10 are mounted in edge-to-edge relation along the full horizontal length of the air intake passage 14, the number of flame retarding filter devices 10 employed being independent upon the selected size of the exhaust canopy.

Figure 3:
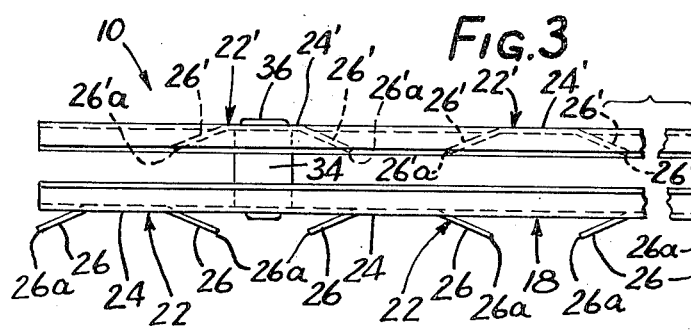
FIG. 3 is s top end view taken substantially along the line 3—3 of FIG. 2, looking in the direction of the arrows.
Figure 4:
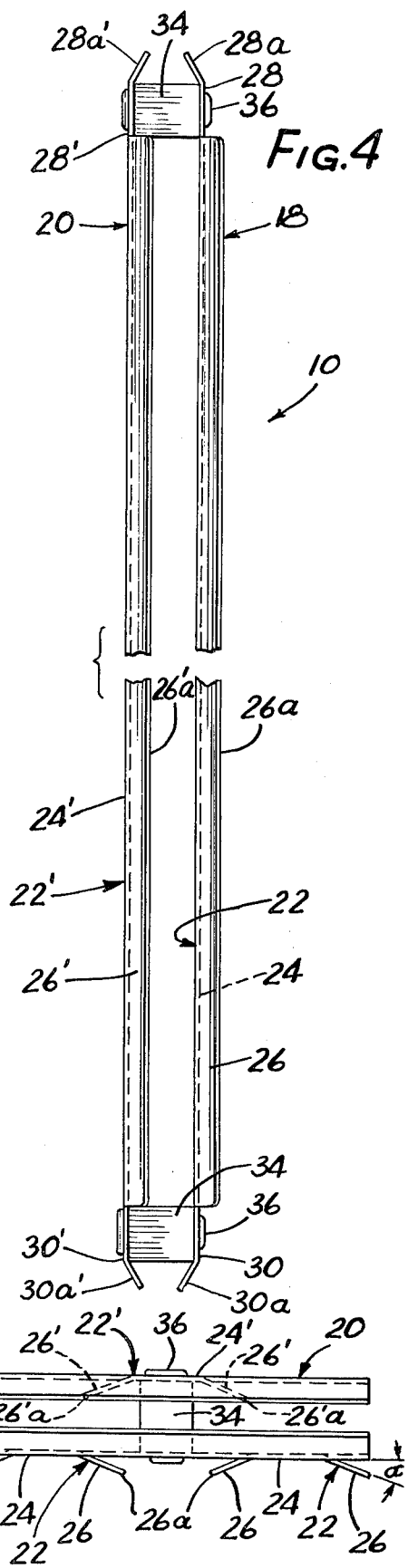
FIG. 4 is a side edge view taken substantially along the line 4—4 of FIG. 2, looking in the direction of the arrows.

Referring particularly to FIGS. 2–4, each flame retarding filter device 10 includes a first or forward set of elongated baffle elements, indicated generally at 18, and a second or rearward set of elongated baffle elements, indicated generally at 20. The forward set of baffle elements 18 includes a plurality of parallel spaced identically shaped baffle elements 22 each of which has a generally planar longitudinal central portion 24 and longitudinally extending edge portions 26 which are angularly inclined relative to the associated planar central portion 24. The longitudinal edge portions 26 of the baffle elements 22 are inclined in the same direction relative to the associated central planar portions 24, as best seen in FIG. 3. In one embodiment of the flame retarding filter device 10, the central planar portion 24 of each of the baffle elements 22 has a transverse width of approximately ½ inch, while each of the inclined longitudinal edge portions 26 has a transverse width, considered in the plane of the inclined edge, of approximately ⅝ inch. The angle of inclination of each of the inclined longitudinal edge portions 26, relative to the plane of its central planar portion 24, is approximately 30° as indicated by the angle alpha in FIG. 3. The baffle elements 22 are formed such that the outer longitudinal edge 26a of each inclined edge portion 26 is spaced from the outer inclined longitudinal edge 26a of the next adjacent baffle element by a distance of approximately ⅝ inch.

The parallel spaced baffle elements 22 comprising the forward set of baffle elements 18 are of equal length and are connected at their opposite ends to upper and lower transverse members 28 and 30. In the illustrated embodiment, the baffle elements 22 are formed, such as by stamping, from a generally rectangular sheet of suitable material so that the transverse members 28 and 30 are formed integral with the baffle elements 22. It will be understood that the baffle elements 22 could be formed individually and have their opposite ends connected to suitable transverse members, similar to the transverse members 28 and 30, by welding, riveting or the like. The baffle elements 22 and associated upper and lower transverse members 28 and 30 are preferably made of a suitable metallic material, such as twenty four gauge stainless steel of the non-hardenable chromium type stainless which combines high heat resistance and good mechanical properties with high resistance to such corrosives as nitric acid, sulphur gases, and organic and food acids.

The second or rearward set of baffle elements 20 includes a plurality of parallel spaced baffle elements 22' which are substantially identical in configuration to the baffle elements 22 forming the forward set of baffle elements 18. To this end, each of the rearward baffle elements 22' includes a generally central planar portion 24' and longitudinally extending edge portions 26' which are inclined relative to the central planar portion 24' in identical fashion to the longitudinal edge portions 26 of the forward baffle elements 22.

The rearward baffle elements 22' are similarly secured at their opposite ends to upper and lower transverse support members 28' and 30', respectively, which, in the preferred embodiment, are formed integral with the rearward baffle elements 22'. The parallel baffle elements 22' of the rearward set of baffle elements 20 are laterally spaced apart such that adjacent longitudinal edges 26'a of the inclined portions 26' are spaced approximately ⅝ inch apart.

The rearward set of baffle elements 20 is secured to the forward set of baffle elements 18 such that the baffle elements 22 and 22' are disposed in parallel spaced relation. To this end, the upper and lower pairs of transverse members 28, 28' and 30, 30', respectively, are maintained in fixed parallel relation by tubular spacers 34 which receive rivets 36 or other suitable connecting means therethrough. The outer ends of the rivets 36 are received through suitable openings in the respective transverse members 28, 28', 30 and 30', and are peened in a conventional manner. A plurality of the rivets 36 and associated spacers 34 are provided along the lengths of the upper and lower transverse support members 28, 28', 30, 30' as necessary to maintain the sets of baffles in assembled relation. The rearward set of baffle elements 20 is offset relative to the forward set of baffle elements 22, when considered in FIG. 3, such that the central planar portions 24' of the rearward baffle elements 22' are disposed rearwardly of the spaces between the adjacent forward baffle elements 22, with the inclined longitudinal edge portions 26' of the rearward baffle elements 22' being disposed generally rearwardly of the inclined longitudinal edge portions 26 of the forward baffle elements 22. The spacers 34 have longitudinal lengths sufficient to maintain the forward and rear baffle elements 22 and 22' spaced apart approximately ⅝ inch, considered between the plane of the forward central portions 24 and the plane of the rearward central portions 24'.

With particular reference to FIG. 4, each of the transverse end members 28 and 30 of the forward set of baffle elements 18 has an inclined edge portion, indicated at 28a and 30a respectively, which is inclined toward the rearward set of baffle elements 20. The transverse edge portions 28a and 30a are inclined at approximately 30° relative to the plane of the planar portions 24 of the forward baffle elements 22. The upper and lower transverse members 28' and 30' of the rearward set of baffle elements 20 have inclined edge portions 28a' and 30a' which are inclined in the direction of the forward set of baffle elements 18 at angles of approximately 30° relative to the plane of the central portions 24' of the rearward baffle elements 22'. The pairs of opposed inclined edges 28a, 28a' and 30a and 30a' of the forward and rear sets of baffle elements 18 and 20 serve to define drain channels which are open along substantially the full transverse width of the filter device 10.

It will be noted that the flame retarding device 10 is substantially symmetrical about the transverse center of the filter device, as considered in FIG. 4, with the upper and lower ends of the filter device being substantially identical. The flame retarding filter device 10 may thus be mounted with the presently defined upper transverse members 28 and 28' serving as either the upper or lower end of the filter device. Considering the filter device 10 mounted as shown in FIG. 1, any grease particles which condense upon the surfaces of the forward and rear baffle elements 22 and 22' will pass downwardly on the respective forward and rearward baffle elements until the droplets reach the lowermost transverse edges of the inclined edge portion 30a and 30a' whereupon they will drop off into a drain channel (not shown) such as may be formed adjacent the air intake passage 14 in the exhaust canopy 12.

Figure 5:
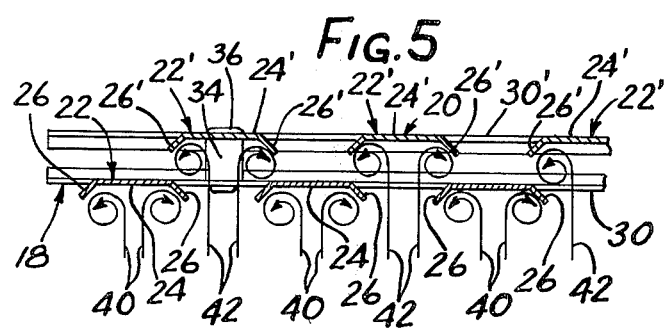
FIG. 5 is a partial transverse sectional view taken substantially along the line 5—5 of FIG. 2, and schematically illustrates the action of the flame retarding filter on air flow and flame directed generally normal to the plane of the filter device.

FIG. 5 schematically illustrates the operation of the flame retarding filter device 10 when air and/or flame is directed toward and generally normal to the planes of the planar portions 24 and 24' of the forward and rear baffle elements 22 and 22', respectively. When air is directed generally normal to the forward and rear rows of baffle elements 22, such as along air paths represented by the lines 40 and 42, the air which impinges against the forward baffle elements 22 is caused to curl by the inclined edge portions 26 in a manner to be substantially turned back upon itself in a direction generally reverse to its direction of impingement. The air which passes between the parallel spaced forward baffle elements 22 impinges the rearward baffle elements 22' which, as noted above, are disposed rearwardly of the spaces between the forward baffle elements 22. The air impinging against the rearward baffle elements 22' is caused to curl by the inclined edge portions 26' in a manner to substantially reverse its direction of movement from its initial direction of impingement. The lines 40 and 42 and associated arrowheads may also represent the direction of flames which may impinge against the flame retarding filter device 10, with the arrows representing the reversal of direction of the flames and retarding of their attempted penetration of passage through the flame retarding filter device 10 in a manner which could cause any grease residues disposed on the grease filter 16 or grease deposits on the interior surfaces of the air ducts rearwardly of the passage 14 to ignite with resulting fire hazards. While causing the flames impinging against the filter device 10 to be thus retarded, sufficient free flow of air is allowed through the filter device to effect exhaust of heat and odors from the room in which the filter device and associated exhaust system is employed.

Thus, in accordance with the present invention, a flame retarding filter device is provided which substantially enhances the safety of exhaust systems utilized in kitchens and the like where exhaust air may contain combustible particles such as grease and the like susceptible to combustion. The flame retarding filter device in accordance with the present invention provides efficient flame retardation and has a relatively thin profile thickness, being approximately ⅝ inch thick, which lends itself to mounting in standard size 1⅞ inch U-shaped support channels of exhaust canopies in back-to-face relation with a mesh type grease filter of the type exemplified by the Series 6400 grease filter available from the assignee of the present invention.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. A flame retarding filter device for use in an air flow exhaust system which includes means for moving air through an exhaust path, and wherein the air may have combustible particles entrained therein, said flame retarding device comprising, in combination, a first set of baffle elements including a plurality of elongated baffle elements each of which has a generally planar longitudinal central portion and longitudinal edge portions angularly inclined relative to their associated planar central portion, means connecting the opposite ends of said first baffle elements such that said first baffle elements are disposed in parallel spaced relation with said planar central portions thereof lying substantially in a common plane and said longitudinal edge portions being angularly inclined from a common side of said common plane, a second set of baffle elements including a plurality of elongated baffle elements similar in configuration to said first baffle elements, means connecting the opposite ends of said second baffle elements such that said second baffle elements are disposed in parallel spaced relation and have their planar central portions lying in a common plane with their longitudinal edge portions inclined from a common side of said common plane, and means interconnecting said first and second sets of baffle elements such that said common planes are disposed in parallel spaced relation and said edge portions of each of said sets are inclined forwardly of said respective parallel planes, said first and second sets of baffle elements being offset relative to each other such that the planar central portions of the baffle elements of one set of baffle elements are disposed rearwardly of the spaces established between the baffle elements of the other set with the inclined longitudinal edge portions of said one set of baffle elements each being disposed rearwardly of at least a portion of an inclined longitudinal edge of a baffle element of said other set, when considered with the baffle elements disposed in generally vertical positions, said inclined longitudinal edges of said first and second sets of baffle elements being inclined such that flames impinging the forward set of said baffle elements in a direction generally normal to said common planes are turned back upon themselves in a direction substantially reverse to the direction of impingement, and any flames passing between the baffle elements of said forward set of baffle elements will impinge the rearward baffle elements and be turned back in a direction substantially reverse to the direction of impingement, said means connecting said opposite ends of said first baffle elements and said means connecting said opposite ends of said second baffle elements comprising upper and lower spaced support members disposed transverse to their associated baffle elements and said upper and lower support members forming pairs of upper and lower opposed support members which define drain openings facilitate drainage of grease or condensate formed on said baffle elements through the lower of said drain openings when said device is mounted in a manner such that said baffle elements lie in generally vertical planes with their longitudinal axes inclined or normal to horizontal.

2. A flame retarding device as defined in claim 1 wherein said longitudinal edges of each of said baffle elements are generally planar and form an obtuse included angle with the associated planar central portion of the baffle element.

3. A flame retarding device as defined in claim 2 wherein said longitudinal edge portions form equal angles of inclination with the plane of the planar central portion of the associated baffle element.

4. A flame retarding device as defined in claim 1 wherein said drain openings extend substantially the full transverse width of the device.

5. A flame retarding device as defined in claim 4 wherein said baffle elements are formed from a unitary sheet of material with said support members connecting the opposite ends of said baffle elements being formed integral with the associated baffle elements.

6. A flame retarding device as defined in claim 1 wherein said baffle elements of each of said first and second baffle elements are equally spaced apart.

7. A flame retarding device as defined in claim 1 wherein said first and second sets of baffle elements are secured together in said spaced parallel relation by relatively short spacer means disposed between said means connecting the opposite ends of said first and second baffle elements whereby to provide a flame retarding device having a thin profile.

8. A flame retarding device as defined in claim 1 wherein said transverse support members connecting said first set of baffle elements are oppositely disposed to the corresponding transverse support members connecting said second set of baffle elements, and each of said support members has a longitudinal edge portion inclined in the direction of the opposing transverse support member to define therewith said drain openings which extend substantially the full transverse width of said device.

* * * * *